United States Patent [19]

Gray

[11] Patent Number: 4,695,248

[45] Date of Patent: Sep. 22, 1987

[54] PULSE COMBUSTION DRYING APPARATUS FOR PARTICULATE MATERIALS

[76] Inventor: Robert R. Gray, 7110 Via Monte Mar Dr., Gladstone, Oreg. 97027

[21] Appl. No.: 783,861

[22] Filed: Oct. 3, 1985

[51] Int. Cl.[4] .......................... F27B 15/00; F27D 7/00; F23C 11/04
[52] U.S. Cl. ........................................ 432/58; 431/1; 432/25
[58] Field of Search .................. 432/25, 58; 431/1

[56] References Cited

U.S. PATENT DOCUMENTS 2,838,869  6/1958  Desbenoit et al. .................. 239/587
4,057,908  11/1977  Mirliss et al. ......................... 432/13

Primary Examiner—John J. Camby

[57] ABSTRACT

Pulse combustor apparatus for the drying of particulate materials having the combustion chamber and the exhaust system components disposed on a common longitudinal axis and wherein backflow gas flowing through an adjacent augmenter duct is directed into encircling relation with the downstream exhaust system components to control the temperature conditions therewithin.

6 Claims, 3 Drawing Figures

PULSE COMBUSTION DRYING APPARATUS FOR PARTICULATE MATERIALS

This invention relates to the drying of particulate material and more particularly to improved methods and apparatus for the pulse combustion drying of particulate material.

BACKGROUND OF THE INVENTION

Pulse combustion drying, employing a pulse combustor essentially similar in nature to a pulse jet engine, is a relatively recent but recognized technique for effecting the drying of particulate materials. Illustrative of some earlier endeavors in pulse jet field for drying and other purposes are U.S. Pat. Nos. 3,618,655; 4,226,668; 4,226,670; 4,265,617 and 2,838,869. In the first of these patents a plurality of pulse jet engines are mounted at the base of a vertical chamber. A paste or slurry of the particulate material to be dried is introduced into the exhaust duct of such pulse jet engines which function to at least partially dry the particulate material and introduce it into the chamber where induced vortex gas flow causes circulation of the particulate material and consequent opportunity for further drying thereof. In the latter of these patents a linear pulse jet engine assembly for projecting various types of materials is disclosed.

A current state of the art pulse combustion dryer is made and sold by Sonodyne Industries of Portland, Oregon. The pulse combustor unit, which is the heart of the drying system, is a specially contoured and generally U-shaped hollow tube whose dimensions and materials of construction determine its operation. The pulse combustion process is initiated when air and fuel from a constant low pressure supply thereof are drawn into the combustion chamber portion of the combustor and ignited by a spark. Hot gases created by the resulting detonation move in both directions from the combustion chamber. In one direction, they pass through an inlet nozzle and adjacent air augmenter, and in the other direction, through U-shaped exhaust section and past a raw material injection port at the downstream end thereof. Detonation in the combustion chamber causes the pressure therein to rise, momentarily shutting off the fuel supply. As the combustion chamber pressure falls following detonation, fuel is again admitted and mixed with air being drawn through the inlet nozzle. Detonation occurs again, either because of contact between the explosive air-fuel mixture and the spark or by contact with the sufficiently hot wall of the chamber itself. Once the wall temperature reaches approximately 1800° F., the spark can be extinguished and the process becomes self-igniting.

The pressure fluctuation, which causes the pulsing behavior of the combustor, results in strong standing waves of sound energy which move in both directions from the chamber. Repeated detonations also create high speed displacement of hot gases with about 90% thereof exiting through the tailpipe and associated exhaust system components. Introduction of moisture laden particulate material into the downstream end of the exhaust sections subjects such material to the sound waves which, although not fully understood, are believed to break the bonds between the solid particulate matter and the liquid, most often water, and in an atomization of the water into fine droplets with a consequent increase in surface area for evaporation. The heat present in the exhaust gas interacts with the atomized cloud of introduced raw material allowing highly efficient evaporation to occur. During drying, the rapid evaporation of the water absorbs most of the heat and the solid particulates are maintained and exit in a relatively cool state. It should be noted that while operating temperatures in the pulse combustion exhaust system exceed 2500° F., the residence time of the raw product solids in contact with the exhaust gases is very short, being in the order of a few milliseconds. Because of such short residence time and the high heat consumption effected by evaporation, the temperatures of the dried solid particulates rarely exceeds 100° to 150° F.

While pulse combustion drying apparatus of the type described immediately above has proved to be both efficient and economical in the drying of many diverse materials, the basic U-shaped configuration of the combustion chamber and downstream exhaust portions thereof has created certain assembly and maintenance problems as well as introducing certain system instabilities.

SUMMARY OF THE INVENTION

This invention may be briefly described as an improved construction for pulse combustion drying apparatus and which includes, in its broad aspects, the provision of an improved pulse combustion dryer system wherein the inlet nozzle, combustion chamber, tailpipe and drying cone have a common straight line axis. In a narrower aspect, such improved straight line pulse combustion drying apparatus includes an auxiliary and elongate gas augmenter and the utilization of gas delivered therefrom to control exhaust gas stream temperatures in the tailpipe and drying cone sections of the primary pulse combustor exhaust system as well as in effecting enhanced secondary drying immediately downstream of the drying cone for heat sensitive materials.

Among the advantages of the subject invention is the provision of improved stability, efficiency and scope of pulse combustor dryer operation. Other advantages include a marked simplicity of assembly, a reduction in wear and maintenance and increased economies of operation. Still further advantages flow from the use of an elongate gas augmenter system which permits beneficial utilization of the gas exiting therefrom with an increased enhancement of performance and flexibility of dryer operations.

The object of this invention is the provision of an improved construction for pulse combustor drying apparatus.

Another object of this invention is the provision of an improved linear construction for pulse combustor drying apparatus in association with an elongate air augmenter system that permits multiple utilization of the back flow gases exiting therefrom.

A further object of this invention is the provision of an improved air augmentation system for pulse combustor dryers that expands the flexibility and scope of usage thereof.

Other objects and advantages of the subject invention will be apparent from the following portions of this specification and from the appended drawings which illustrate, in accord with the mandate of the patent statutes, a presently preferred construction for a pulse combustor drying apparatus incorporating the principles of this invention.

Figure 1:
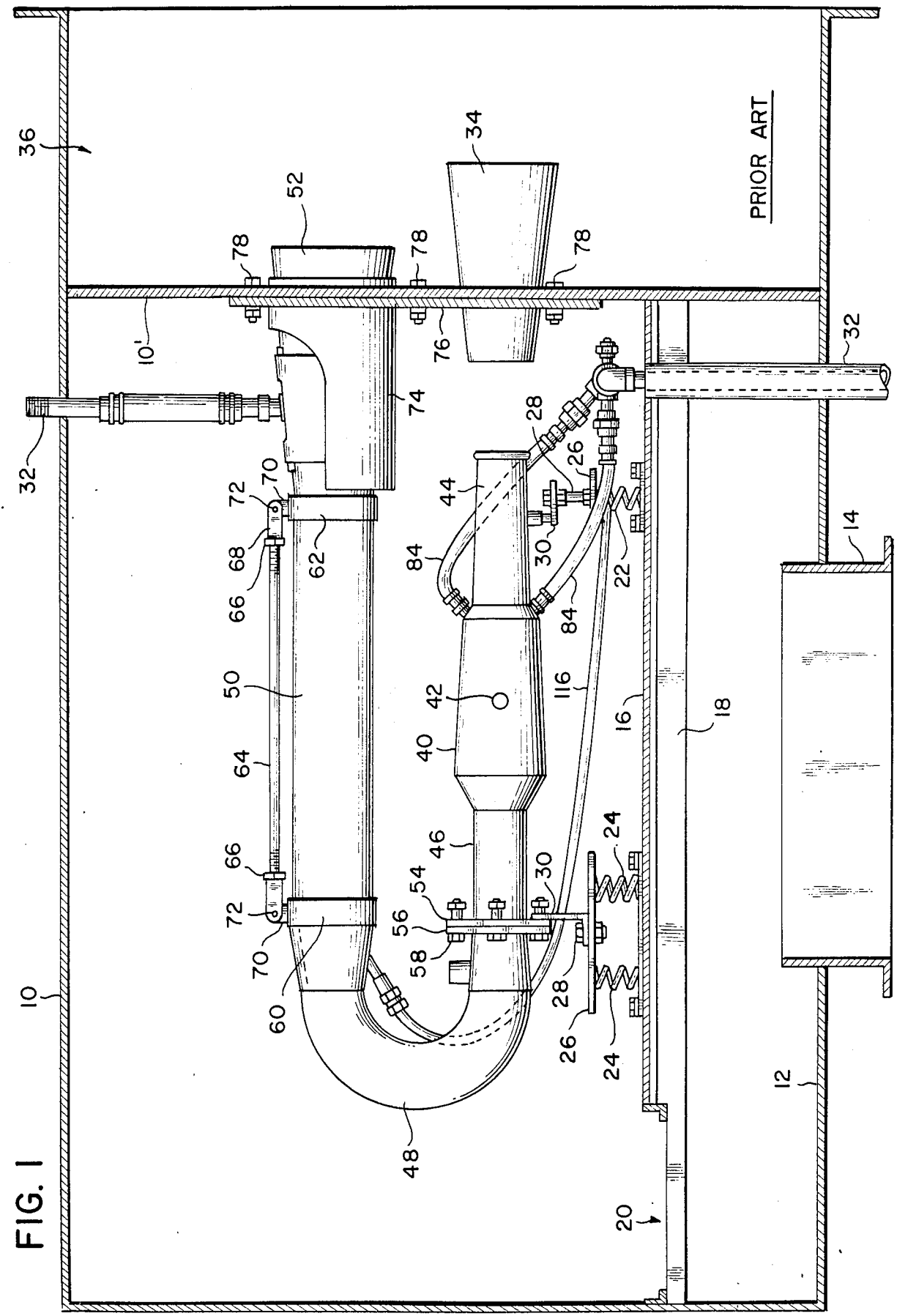
FIG. 1 is a schematic side elevation of a prior art pulse combustor drying system.

Referring initially to FIG. 1, the prior art pulse combustor dryer system there depicted broadly includes an isolating enclosure 10, desirably of double walled soundproof character, having an air inlet conduit 14 on the bottom wall 12 thereof. Disposed within the enclosure 10 is a platform 16 supported on beams 18 in uniform spaced relation to the enclosure bottom wall 12 and forming an inlet air plenum therebetween. The rearward end of the platform 16 terminates short of the rear wall of the enclosure 10 to provide an opening 20 for the passage of air upwardly from the air inlet conduit 14.

Also as illustrated, the pulse jet combustor is mounted in a resilient manner above the support platform 16 so as to cushion the platform and enclosure walls from vibrations incident to the operation of the combustor. Resilient mountings such as a front coil spring 22 and a rear pair of coil springs 24 extend upward from the platform 16, and support mounting plates 26 at their upper ends. Bolts 28 secured removably to the plates 26 serve to secure thereto brackets 30 which connect to and serve to support the front and rear portions of the combustor.

The pulse jet combustor includes a combustion chamber 40 of enlarged diameter provided with a spark plug 42 or other ignition means for igniting a combustible fuel air/mixture. Connected to the combustion chamber 40 is an air inlet conduit 44 which receives atmospheric air from within the enclosure 10, and a combustion gas outlet conduit generally shown at 46.

The combustion gas outlet conduit 46 communicates through an arcuate and generally U-shaped coupling section 48 with a tailpipe 50 which, in turn, communicates at its downstream or exhaust outlet end with a materials dehydration section 52.

In the illustrated embodiment, the combustion gas outlet conduit 46 of the combustion chamber section 40 is provided at its downstream or outlet end with a peripheral flange 54 arranged for removable connection to a corresponding flange 56 at the adjacent upstream or inlet end of the U-shaped coupling or transition section 48, as by means of a plurality of bolts 58. The downstream end of the coupling section 48 is fitted with an outer, forwardly projecting annular collar 60 dimensioned to freely receive therein the adjacent upstream end of the tailpipe section 50.

The downstream end of the tailpipe section 50 is, in similar manner, freely received within an enlarged collar 62 secured to and extending rearwardly of the upstream end of a dehydration section 52 in the form of a hollow truncated cone and generally called a "drying cone". To facilitate tailpipe replacement the collars 60 and 62 are interconnected by a turnbuckle assembly which includes an elongated threaded rod 64 received at its opposite ends in threaded nuts 66. Each nut is secured to a pair of laterally spaced lugs 68 which receive between them an ear 70 extending upwardly from the associated collar. Registering openings in the lugs and ears receive a pivot pin 72 for joining them together.

The dehydration section 52 is supported in a saddle member 74 which is secured to and extends through a mounting plate 76. The mounting plate 76 is secured removably to a wall 10' of the enclosure, as by bolts 78. As is apparent, the dehydration cone 52 terminates within an adjacent collector room 36 wherein the majority of the dried particulates settle out and are collected in any suitable manner. A duct collector or other conventional particulate collecting device is usually connected to the gas exhaust system for such collecting chamber or room 36 to effect recovery of substantially all of the dried particulates.

A wet product inlet conduit 32 is connected to the dehydration cone 52 for introduction of the wet product into the cone in a direction substantially perpendicular to the direction of movement of the high velocity gases of combustion passing through the tailpipe and exiting from the downstream end of the dehydration cone.

Combustible fuel, such as oil, gas, etc. is delivered to the combustion chamber 40 by one or more fuel supply lines, such as the two lines 84 illustrated, connected to the fuel inlet conduit 32.

The plate 76 supporting the dehydration cone saddle 74 also supports a so called "augmenter" in the form of a hollow truncated cone 34 disposed in spaced axial alignment with the air inlet portion 44 of the combustion chamber 40 and which also extends through the forward engine room wall 10'. In the described system, the augmenter 34 functions to direct the high velocity combustion gases emitted as back pressure from the combustion chamber 40 and air inlet conduit 44 into the adjacent collector room 36.

In the operation of the above described pulse combustor system, the combustor is activated by delivery of combustible fuel and air to the combustion chamber 40 where it is ignited by a spark from the plug 42. A wet product in the form of a slurry paste or moist particulate is fed, generally under pressure, through the material inlet conduit 32 from whence it enters the dehydration cone 52 in a direction substantially perpendicular to the direction of flow of high velocity combustion gases through the dehydration cone.

Figure 2:
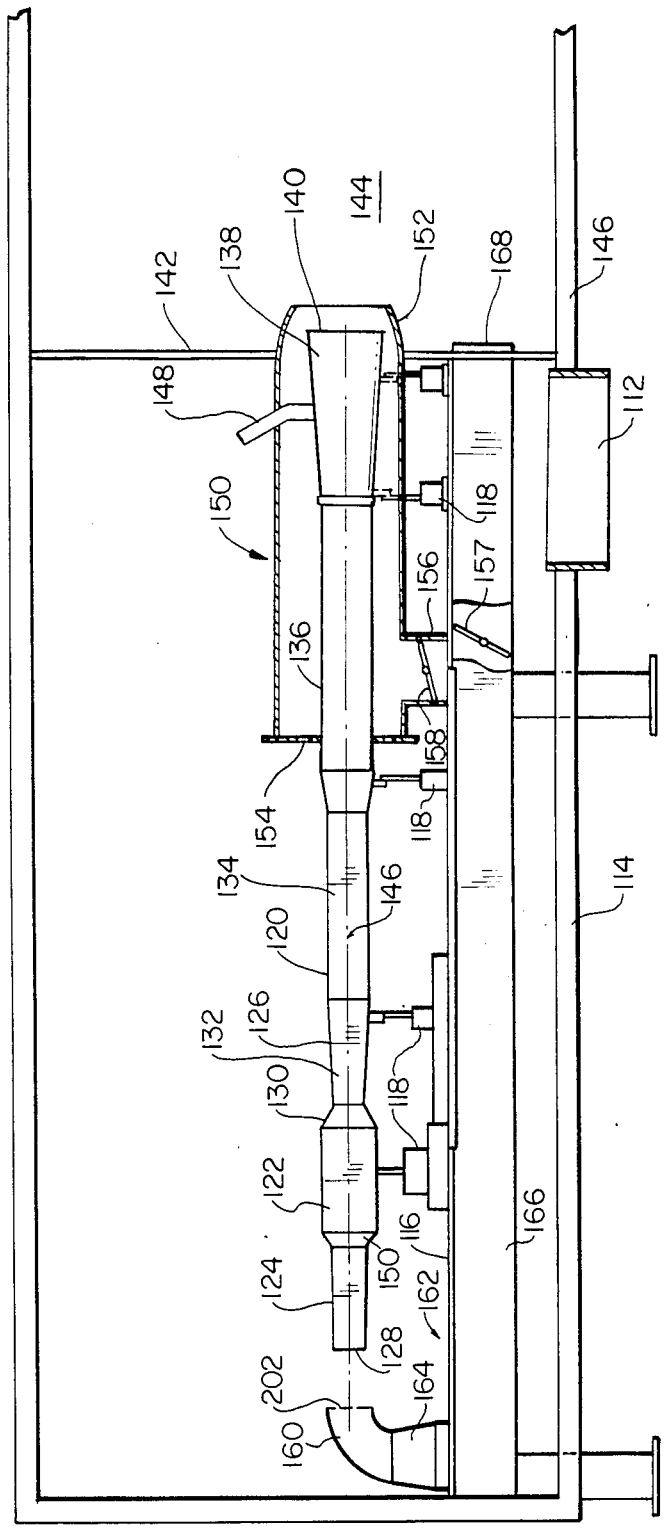
FIG. 2 is a schematic side elevation of an improved construction for a pulse combustor drying system incorporating the principles of this invention.
Figure 3:
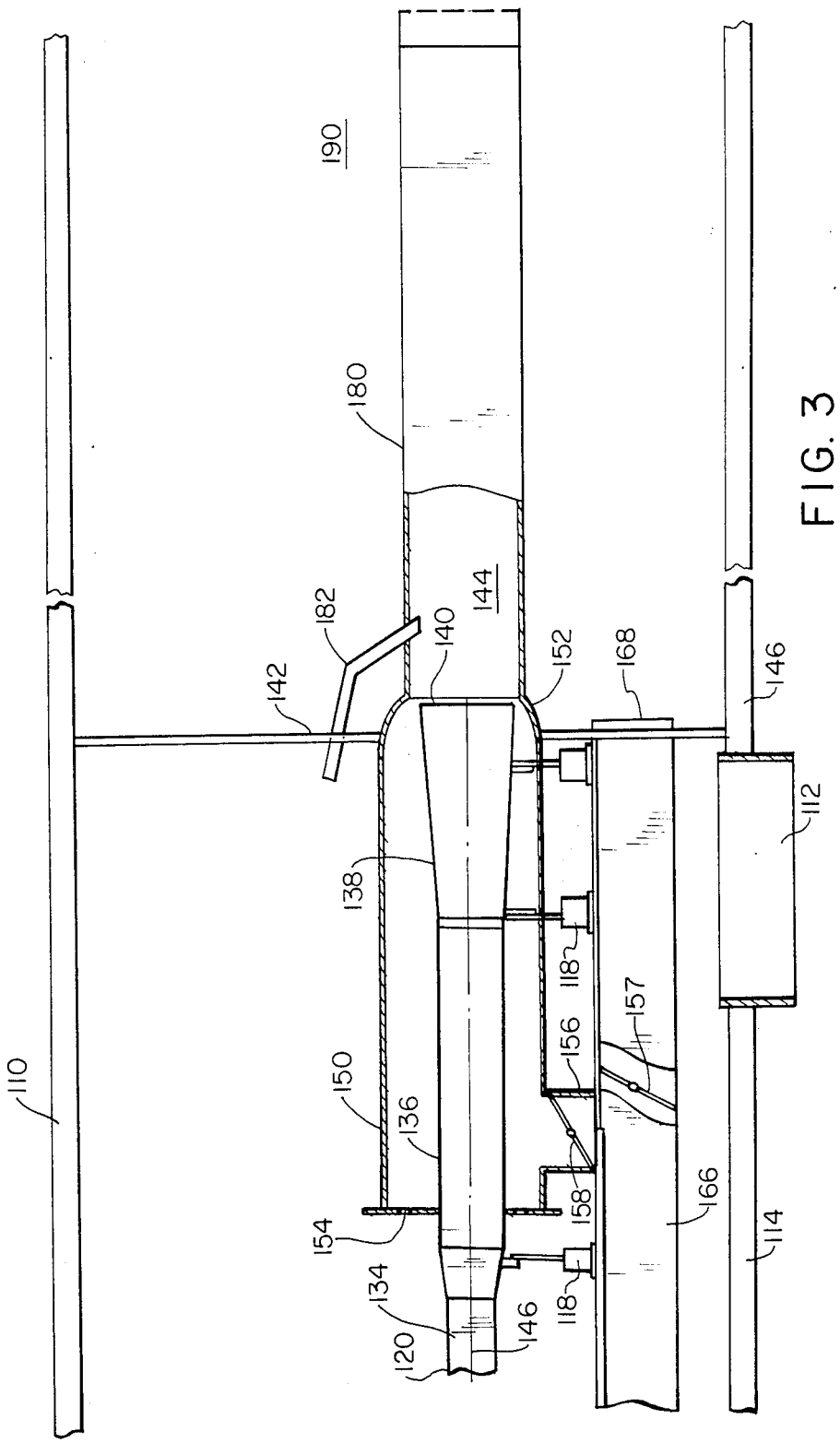
FIG. 3 is a schematic side elevation of an improved construction for a pulse combustor drying that incorporates the principles of this invention that is particularly adapted for the drying of heat sensitive materials.

Referring now to FIG. 2, the improved pulse combustor dryer system includes an enclosure 110, again preferably of double walled soundproof construction, having an air inlet conduit 112 in the floor 114 thereof. Disposed within the enclosure 110 is a platform 116 having a plurality of pedestals 118 for supporting the pulse combustor assembly, generally designated 120, and which is of circular cross section with its horizontal axis in spaced parallel relation with the platform 116. The pulse combustor assembly here includes a combustion chamber 122 having an air inlet conduit 124 on one side thereof and a combustion gas outlet conduit 126 on the other side thereof. The air inlet conduit is of slightly tapered configuration with the diameter thereof increasing from its open end 128 to its juncture with the combustion chamber 122. The combustion gas outlet conduit 126 is of general venturi configuration having a sharply converging entry section 130 adjacent the combustion chamber 122 and a downstream or delivery section 132 of progressively increasing diameter.

The exit end of outlet conduit 126 is connected to an elongate transition section 134 which in turn is connected to an elongate tailpipe 136. The downstream or delivery end of the tailpipe 136 is connected to the entry portion of a drying cone section 138 whose downstream end 140 extends through a bulkhead wall 142 of the enclosure 110 and into an adjacent collector room 144.

In contradistinction to the device shown in FIG. 1 and described earlier, the improved pulse combustor unit has all of its component elements, i.e. air inlet conduit 124, combustion chamber 122, gas outlet conduit 126, transition 134, tailpipe 136 and drying cone 138 located in a straight line with a common longitudinal axis 146.

Disposed intermediate the air inlet conduit 124 and the combustion chamber 122 is a transition wall section 150 of sharply increasing diameter that defines a portion of the combustion chamber 122. Mounted in uniform spaced relation in such wall section 150 are a plurality, preferably four, fuel nozzles 152, so positioned to inject fuel into the combustion chamber 122 at an angle of about 45° to the axis 146 and so that the injected fuel streams are focused on said axis 146 at a common location well within the chamber 122. Many different types of combustible fuels, such as oil, gasoline, kerosene, propane, natural gas and the like, are suitable for use in the described pulse combustor. Also included are one or more auxiliary fuel nozzles 154 mounted in the side wall of the combustion chamber 122 focused at the axis 146 but at a common location downstream therewithin so as to provide, where necessary for certain fuels such as natural gas, a more uniform fuel/air mixture for combustion therewithin.

Disposed at the junction of the combustion gas outlet conduit 126 and the upstream end of the transition 134 and at the junction between the transition 134 and tailpipe 136 are one or more afterburner fuel nozzles 156. Such afterburner nozzles 156 serve, again for particular fuels such as natural gas, to provide additional heat to the exhaust gas stream.

The dehydration drying cone 138 is of frusto-conical configuration with its larger diameter end 140 extending through a bulkhead wall 142 into an adjacent particulate settling and collection chamber 144.

Wet particulate material is introduced into the drying cone 138 through the feed inlet tube 148 in a direction of movement of the high velocity gases of combustion passing through the tailpipe 136 and into the dehydration cone 138.

An elongated and essentially cylindrical sleeve 150 is disposed in coaxial spaced surrounding relation with the major portion of the length of the tailpipe section 136 and over the entire length of the drying cone 138. The end portion 152 of the sleeve is of tapering frusto-conical configuration and extends through the bulkhead 142 past the end 140 of the drying cone 138 within the settling and collecting chamber 144. The upstream end 154 of the sleeve is in the form of an annulus and includes a plurality of adjustable slotted openings therein to regulate the amount of air introduceable therethrough.

Disposed in spaced relation and coaxial alignment with the air inlet conduit 124 is the open end of the elbow shaped entry section 160 of an "augmenter" assembly, generally designated 162. The elbow shaped entry section 160 is connected to a vertical conduit section 164 of expanding cross section which in turn is connected to an elongate conduit section 166 disposed beneath the platform 116. The elongate conduit section is positioned essentially parallel to the axis 146 of the combustor assembly and has its downstream end 168 extending through the bulkhead wall 142 with the settling and collection chamber 144.

The downstream end of the augmenter conduit 166 is connected through a short vertical conduit section 156 to the interior of the sleeve 150 to permit diversion of flow of back flow gas into the sleeve. Dampers 157 and 158 permit full range control of back flow gas either into the sleeve 150 or into the setting and collection chamber 144.

In the operation of the subject device heated back flow gas is directed into the cylindrical sleeve 150 to flow in exteriorly surrounding relation about both the tailpipe 136 and dehydration cone 138 prior to exiting within the setting and collecting chamber 144 in surrounding and continuting relation with the cooled primary exhaust gas stream carrying the dried particulates issuing from the dehydration cone 138. Such intermixture of the heated annular stream of back flow gas issuing from the sleeve 150 and the essentially cylindrical and cooler stream of exhaust gas issuing from the dehydration cone serves to enhance any secondary drying process that continues within the settling and collection chamber 142 as well as providing control of the dew point therewithin.

FIG. 3 illustrates a further improved construction that is particularly adapted to the handling of heat sensitive materials. Referring thereto, there is again additionally provided a sleeve 150 disposed in surrounding relation with the tailpipe 136 and drying cone 138 as shown in FIG. 2 and described in detail above. In this embodiment however a tuned dryer extension 180 is connected to one end of and forms an extension of the sleeve 150. The length of this extension must be selected to be compatible with the combustor system parameters in order for the pulse jet sonic phenomenon to continue therewithin. In contradistinction the diameter of the extension does not seem to be attended with any particular degree of criticality.

In this embodiment, the material to be dried is not introduced into the dehydration cone 138 but rather the wet material of heat sensitive character is introduced through an auxiliary feed inlet 182 at the upstream end of the tuned dryer extension 180 and at a pre-determined distance from the terminal end of the drying cone 138.

In the operation of this embodiment back flow gas flowing in the augmenter conduit 166 is diverted into the cylindrical sleeve 150 and to there flow in surrounding relation to the tailpipe 136 and drying cone 138 toward the downstream end thereof. Since no materials to be dried are here being introduced into the drying cone 138, there will be no heat loss due to evaporation and no marked drop in exhaust gas stream temperature as it flows through the drying cone 138 as is characteristic of operation where the material to be dried is introduced into the drying cone 138. The diverted back flow gas flowing within the sleeve 180 is at a much lower temperature than the primary exhaust stream flowing within the tailpipe 136 and cone 138 and the sleeve 180. This functions as a heat exchanger to reduce the temperature of the primary exhaust stream. Such temperature control can be regulated both by the volume of back flow gas diverted into the sleeve 180 and also by the settings of the slotted air openings 154 at the upstream end thereof.

In addition to such concurrent flow heat exchange within the sleeve confines, the frusto-conical shaped end 152 of the sleeve 150 serves to direct the generally annular back flow gas stream into an intermixing relation with the core like primary exhaust gas stream exiting from the dehydration cone 138. The mixing of such back flow and primary exhaust gas streams results in a further marked reduction in the temperature of the mixture thereof, with a control parameter being afforded by the volume of back flow gas diverted into the sleeve and the amount of air introduced through the slotted openings 154.

The mixed back flow and primary exhaust gas streams will still however be at an elevated temperature and if the dryer extension 180 is of an appropriate length to sustain the sonic standing waves therein, the material introduced through the feed inlet 182 will be subjected to the same conditions that effect drying within the drying cone 138. Here however the gas temperature at the point of introduction will be lower and can be controlled to accomodate different heat sensitive materials and the residence time for the particulate matter in the drying environment will be substantially increased as compared to the conventional drying environment in the cone 138.

In this embodiment the downstream end of the tuned drying cone extension 180 may feed into a settling and collection chamber 190 or may feed directly into dust collection apparatus such as cyclone or a bag house not shown.

I claim:

1. Improved pulse jet combustor apparatus for the drying of particulate material comprising:
   a pulse jet combustor including
   a combustion chamber, an air inlet conduit connected to one end thereof, a primary exhaust outlet conduit connected to the other end thereof, an elongate tailpipe section disposed downstream of said exhaust conduit and a frusto-conically shaped drying section connected to said tailpipe section
   an augmenter duct having an upstream end positioned to receive secondary back flow exhaust gas emanating from said inlet conduit and a downstream end disposed remote therefrom,
   a sleeve member having an upstream and a downstream end disposed in surrounding spaced relation with said tailpipe and drying sections and having its downstream end disposed in surrounding proximate relation with the downstream end of said drying cone,
   conduit means interconnecting the downstream end portion of said augmenter duct with the upstream end of said sleeve member for effecting the introduction of secondary back flow exhaust gas therein and
   means for controlling the volume of said secondary back flow exhaust gas directed from said augmenter duct into said sleeve member.

2. The improved pulse jet combustor apparatus as set forth in claim 1 further including means disposed at the upstream end of said sleeve member for regulating the amount of air introduceable therein.

3. The improved pulse jet combustor apparatus as set forth in claim 1 wherein the downstream end of said sleeve member is of decreasing diameter frusto-conical configuration 4. The improved pulse jet combustor apparatus as set forth in claim 1 further including means for introducing particulate material to be dried into said drying section.

5. The improved pulse jet combustor apparatus as set forth in claim 1 further including a tuned drying extension connected to the downstream end of said sleeve member for receiving and confining the primary exhaust gas flow emanating from said drying section and said secondary back flow exhaust gas flow emanating from a said sleeve member and
   means for introducing particulate material to be dried into said tuned drying extension adjacent to the downstream end of said sleeve member.

6. The improved pulse jet combustor as set forth in claim 1 wherein
   said inlet conduit, combustion chamber, outlet conduit, tailpipe and drying sections have a common linear longitudinal axis and define a continuous closed gas combustion and exhaust system, and
   said augmenter duct is disposed in substantially parallel spaced relation with said pulse jet combustor components.

* * * * *